(12) United States Patent
Bates et al.

(10) Patent No.: US 6,795,207 B1
(45) Date of Patent: Sep. 21, 2004

(54) SYSTEM AND METHOD FOR CONTROLLING PRINT JOBS IN HOST BASED PRINTERS

(75) Inventors: John Booth Bates, Lexington, KY (US); Mark Walter Fagan, Lexington, KY (US); Richard Francis Russell, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 872 days.

(21) Appl. No.: 09/632,822

(22) Filed: Aug. 7, 2000

(51) Int. Cl.[7] ............................................. G06K 15/00
(52) U.S. Cl. ..................................... 358/1.15; 358/1.17
(58) Field of Search ................................ 358/1.1, 1.11, 358/1.13, 1.14, 1.15, 1.17, 1.16, 402, 540; 400/76, 61

(56) References Cited

U.S. PATENT DOCUMENTS

| | | | |
|---|---|---|---|
| 4,958,298 A | 9/1990 | Okamoto | |
| 4,991,972 A | 2/1991 | Ikenoue et al. | |
| 5,633,992 A | 5/1997 | Gyllenskog | |
| 5,634,090 A | 5/1997 | Narukawa et al. | |
| 5,706,412 A | 1/1998 | Kojo | |
| 5,816,714 A | 10/1998 | Hori | |
| 5,918,071 A | 6/1999 | Kojo | |
| 5,970,222 A | 10/1999 | Gusmano et al. | |
| 6,244,762 B1 * | 6/2001 | Fukano et al. | 400/70 |

* cited by examiner

*Primary Examiner*—Arthur G. Evans
(74) *Attorney, Agent, or Firm*—Needle & Rosenberg

(57) ABSTRACT

A system and method for controlling a print job in a printer, such as canceling the print job held in the printer. The system includes a printer having a processor that receives print jobs, including one or more print data swaths, from one or more host computers, and each print data swath includes at least a predefined group of characters. The system also has at least one host computer in communication with the printer and which selectively sends print jobs including print data and/or command data. The host computer further selectively sends a command which is a predetermined group of characters within the print data swath, and the command alters a function in the printer. The command is preferably a series of identical characters, such as NULL characters, and the command preferably causes the printer to enter a command mode to execute the commanded function. The inventive method of controlling print jobs includes the steps of sending a print job having one or more print data swaths from the host computer to the printer, sending a command embedded in a print data swath from the host computer to the printer, and altering a function of the printer with respect to the print job based upon the command received. The method preferably further includes the step of sending a message from the printer to the host computer once the function in the printer has been altered, such as the print job being purged, and to request the host computer to cease sending characters which comprise the command.

22 Claims, 2 Drawing Sheets

SYSTEM AND METHOD FOR CONTROLLING PRINT JOBS IN HOST BASED PRINTERS

BACKGROUND OF THE INVENTION

1. Field of the Invention

The present invention generally relates to computer systems including host computers and peripheral devices. More particularly, the present invention is for controlling print jobs in a printer being hosted by one or more computers.

2. Description of the Related Art

Host-based printers are printers in communication with one or more host computers that send print jobs to the printer containing print data to be printed upon a media. The host computers also typically send commands to the printer either with the print jobs or separately therefrom. The print and command data is received from the host typically via the parallel or USB port of the printer. In most printers, there are two different states in which the printer receives data from the host: Command Mode and Print Data Mode.

In Print Data Mode, the printer receives printer swath data ("print data") at high speed using a DMA (direct memory access) channel to the processor of the printer. In Command Mode, the printer receives data one byte at a time at the processor and interprets that byte of data before receiving the next byte. Thus, the rate at which data is processed in Command Mode is very slow when compared to Print Data Mode since the printer does not interpret or parse the print data.

Further, in existing host based printers, altering a function of the printer, such as purging a print job, can be accomplished with an INIT line under two conditions: host to printer connection is via parallel port and the host operating system allows the host software to directly manipulate the INIT line. This technique allows a print job to be purged quickly, however, such technique is limited in that it only applies to parallel ports in some operating systems.

An alternative technique that is applicable to any operating system and type of communication port involves sending a fixed length of NULL or other characters to guarantee the transition from print data mode to command mode so that the host can send additional commands to purge the print job. The disadvantage of this technique is that a long delay can occur as a fixed length of NULL or other characters that comprise a command is typically set by the maximum print swath buffer size, which can be very large.

An example of the time required to purge a print job in a typical printer is as follows:
Print Data Mode (Swath) data rate=the rate at which the printer can accept.
Print data Command Mode data rate=the rate at which the printer can accept Command Mode data.
Swath Buffer Size=the total size of a Swath of print data.
Swath Bytes Transferred=the amount of data that has been transferred for a given Swath.
Swath Bytes Remaining=the amount of data that remains to be transferred for a given
Swath, noting that Swath Buffer Size=Swath Bytes Transferred+Swath Bytes Remaining.
Time To Purge Print Job=Swath Bytes Remaining x Print Data Mode data rate+
Swath Bytes transferredxCommand Mode data rate.
So, an example of the time required to cancel printing in a typical case is:

Print Data Mode data rate=5 microseconds/byte
Command Mode data rate=100 microseconds/byte
Swath Buffer Size=128,000 bytes
Swath Bytes Transferred=100,000 bytes
Swath Bytes Remaining=28,000 bytes
Time To Purge Print Job=28,000×5 microseconds+100,000× 100 microseconds=10.14 seconds.

Accordingly, it would be advantageous to provide a manner to expeditiously send a command to a printer, such as effectuating a print job cancellation and purging the print job in the printer, with the least possible time delay. It is to the provision of such a system and method that the present invention is primarily directed.

SUMMARY OF THE INVENTION

The present invention is a system and method for controlling a print job in a printer that is in communication with one or more host computers. The system includes a printer that receives print jobs from one or more host computers that are in communication therewith. The printer includes a processor that receives one or more print data swaths from the one or more host computers, and at least one of the print data swaths including at least a predefined group of characters. There is at least one host computer in communication with the printer and the host computer selectively sends print jobs including one or more print data swaths and command data to the printer. The host computer further selectively sends a command comprised of a stream of predetermined characters within the print data swath, and the command alters function in the printer when received by the printer. More preferably, the host computer further selectively sends a command comprised of a stream of characters within the print data swath to get the printer into command mode, and the host computer continues to send characters in command mode until a predetermined number of characters alters the function in the printer. And once in the command mode, the printer preferably sends a message back to the host computer indicating that a function has been changed and/or telling the host computer to cease sending the command to the printer, i.e. cease transmitting a stream of identical characters.

The command sent from the host computer preferably purges a print job in the printer. Further, the command is preferably comprised of a series of identical characters that are sent in the print data swath and are interpreted after the print data swath is received. In the preferred embodiment, the command is comprised of a series of null characters either sent in a predetermined group or in a continuous stream.

The invention includes a method of controlling print jobs in a printer receiving print jobs from one or more host computers which includes the steps of sending a print job including one or more print data swaths from the host computer to the printer, sending a command embedded in the print data swath from the host computer to the printer, and altering a function of the printer with respect to the print job based upon the command received. The step of altering a function of the printer is preferably purging a print job in the queue. And the step of sending a command in the print data swath is preferably sending a series of identical characters in the print data, such as sending a series of null characters from the host to the printer in the print data.

This invention particularly discloses a technique whereby a print job can be easily cancelled by the host computer without the use of a hardware signal line. In sending a cancel print or other command in the print data swath, a significant amount of processing time is saved at the printer and the desired function, such as canceling the print job, can be carried out more quickly.

This invention addresses the time delay of the previous cancel print techniques on host-based printers, mostly caused by the unavailability of the INIT line on all port or system configurations. In operation of the preferred embodiment, the printer is purged by sending a string of characters, preferably NULL characters, within the print data swath until a given number of characters have been received by the printer, which is determined after review of the print data swath sent. If a continuous stream of characters is being sent by the host computer, the printer will then preferably send a message to alert the host to stop sending NULL characters in print data swaths as the print job has been purged. Once the host computer receives the alert, the characters will cease to be sent and the printer can continue canceling the print job in the most expeditious manner.

Other objects, features, and advantages of the present invention will become apparent after review of the hereinafter set forth Brief Description of the Drawings, Detailed Description of the Invention, and claims appended herewith.

DETAILED DESCRIPTION OF THE INVENTION

Figure 1:
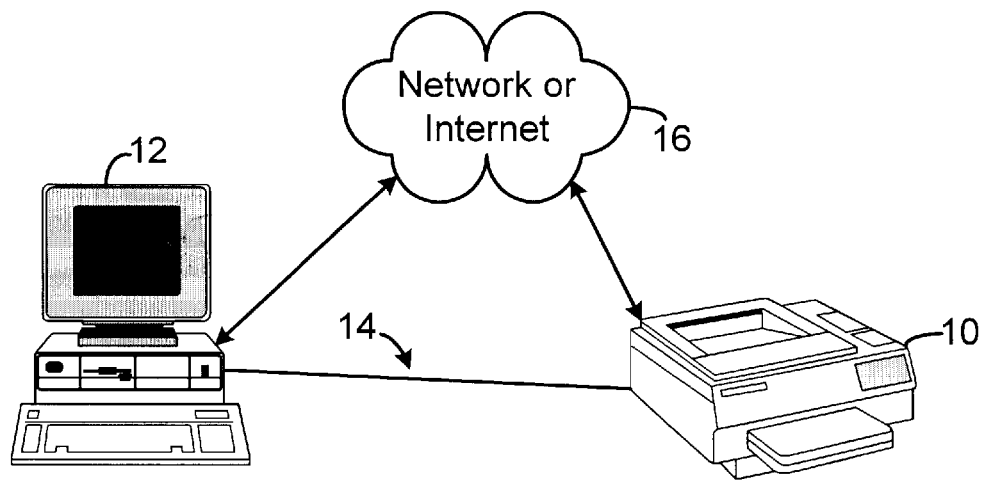
FIG. 1 is a representative view of a printer and a host computer in bi-directional communication.

With reference to the drawings in which like numerals represent like elements throughout the drawings, FIG. 1 illustrates the system for controlling a print job in a printer 10 which is comprised of a printer 10 that receives print jobs from one or more host computers 12. The printer 10 is in communication with the host computer 12 either directly through a communication line 14, or across a network 16, such as a local area network (LAN) or the Internet. The printer 10 is shown here in a generic sense as the system focuses on the processor 28 as shown in FIG. 2, consequently, any type of host-based printer can be used in the present inventive system.

Figure 2:
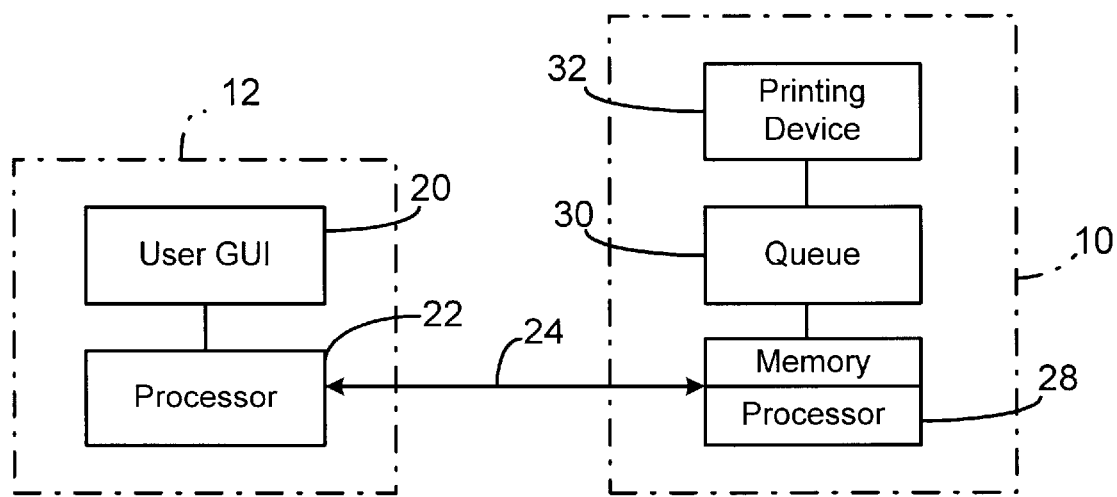
FIG. 2 is a block diagram of the host computer processor in communication with the printer processor, with the print data flowing from the host computer directly to the printer processor.

As shown in FIG. 2, the host computer 12 has a graphic-user interface (GUI) 20 from which a user can send print jobs and commands to the processor 22 of the host computer 12. The processor 22 of the host computer 12 then communicates with the processor 28 of the printer 10, and as shown here, the print data swaths will travel along line 24 to the memory of the processor 28 of the printer 10. Once the print data swath is received by the printer 10, the printer 10 will typically enter a print mode in which it processes the data for printing. The printer 10 would then ordinarily need to receive a command signal, separately from the print data swath, to enter command mode and then cancel a print job or perform another function, and such command could only be received at the end of the print data swath. In the present invention, a predetermined string of characters can be immediately placed in the print data swath to thus cause the printer 10 to immediately enter a command mode, interpret the command, and perform the requested function at the end of that specific print data swath. The printer 10 can then send a signal or message back to the host computer 12 to request that the host computer 12 cease sending the characters in the print data swath that were intended to invoke the print data mode.

The print data swath that travels along line 24 will have access, in some printers direct memory access (DMA), to the processor 28 of the printer 10 and will be received in a expedited manner. The processor 28 of the printer 10 then typically places the print data swath(s) from the host 12 into the memory of the processor 28 printer 10 where it is stored and then sent to the printing device 32 of the printer 10 for printing on a media. The printing device 32 can be any as are known in the art such as ink jets, laser drums, dot matrix, daisy wheel, and the like. The printing speed of the printing device 32 typically dictates the amount of print data that is held in the queue 30 while waiting to print. In a printer 10 that has a fast printing rate, the queue 30 will be emptied quickly, so any delay in processing a command relative to the print job, such as a purge of the print data, must be received and executed quickly in order to affect most of the print data.

The print data swaths from the host computer 12 includes at least a predefined group of characters as would typically be present in a print batch, such as alphanumeric characters, that are commonly represented as bytes in ASCII code. In the present invention, while the host computer 12 selectively sends print jobs including print data swaths and command data to the printer 10, the present invention further selectively sends a command comprised of a predetermined group of the characters within the print data swath, such as a series of NULL or "0" characters. Once the pint data swath is received by the printer, the printer processes the print data swath and determines that the command for altering a function in the printer 10 is present, which is preferably purging the print job at the processor 28, queue 30 and/or printing device 32. Such command is preferably comprised of a series of identical characters, such as a series of 128 NULL characters that, when all characters are received at the processor 28 of the printer within the print swath, purge the print job within the printer. Once the presence of the purge command is determined, the printer 10 preferably invokes the command mode and, if so programmed, will cease the print job in progress, and perform the requested command.

In the preferred embodiment, once the commanded function has been realized by the printer 10, preferably once in the command mode, the processor 28 preferably sends a message, such as an alert, back to the host computer 12 to indicate that the function, such as purging a print job, has been performed. The message can also trigger the processor 22 of the host computer 12 to cease sending the constant stream of characters to the processor 28 as the command mode has been entered. The printer 10 can then effectuate the desired change and can further transmit a message to the host computer 12 that the function has been effectuated in the printer 10.

Figure 3:
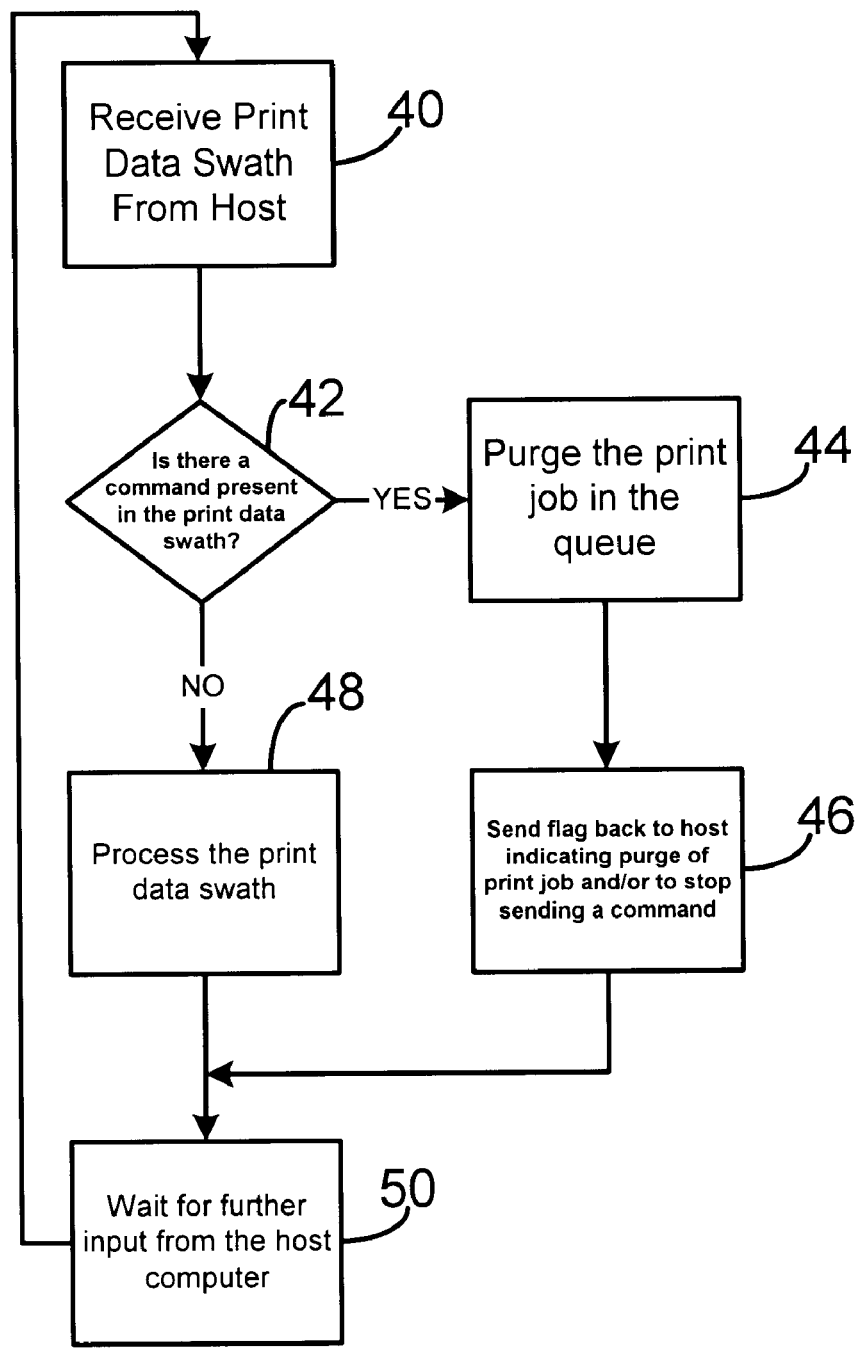
FIG. 3 is a flowchart representing a print job processing loop executed on the printer processor which receives and processes print jobs including print data and command data.

With reference to FIG. 3, the preferred execution of loop of the printer processor 28 is illustrated. The printer 10 receives a print data swath (either by itself or in sequence with others) from the host computer 12, shown at step 40, and a decision is made as to whether a command, such as predetermined number of null characters (or other characters), is present in the print data swath, shown at decision 42. If a command is present, such as the predetermined number of characters to purge the print data swath, and the printer 10 will preferably enter the command mode and the print job in the printer queue 30 is purged (or other commanded function executed), as shown at step 44, and a flag, or other alert or message, is preferably sent back to the host computer 12 indicating the purge of the print job or other function performed, as shown at step 46. Also, when the host computer 12 sends a continuous stream of characters to the printer 10 within the print data swath as a command to purge the print job, the receipt of the flag at the host computer 12 informs the host computer 12 to cease the stream of characters as the command receipt has been indicated.

If, at decision 42, there was not a command present, such as a predetermined series of NULL or other characters present, then the print data swath is further processed, as shown at step 48, such as being sent to a queue 30 for printing. After either the flag is sent back to the host computer 12 indicating the purge of the print job (step 46) or the print data swath is further processed (step 48), the processor 28 enters a wait state wherein the printer 10 waits for further input from the host computer 12, as shown at step 50. The printer 10 can either wait in a print mode, a command mode, or a specific wait mode, depending upon the specific printer involved. Once another print job with a print data swath (which could only be a command from the host instead of a print data swath) is received, step 40 is repeated.

Accordingly, the present inventive system offers a significant savings in time for the receipt of commands within the print data swath at the printer while in the print mode and subsequent execution of the commands, as opposed to waiting to enter the command mode before receiving and executing the function. For example, a purge command using the inventive system yields the following time savings over the prior art printers:

Print Data Mode (Swath) data rate=the rate at which the printer can accept Print (Swath) data.
Command Mode data rate=the rate at which the printer can accept Command Mode data.
Swath Buffer Size=the total size of a Swath of print data.
Swath Bytes Transferred=the amount of data that has been transferred for a given Swath.
Cancel Command Length=the length of the command (a series of NULLs, in this case) that the printer will interpret as a "cancel print" command.
Time To Purge Print Job (with the invention)=Swath Bytes Remaining×Print Data Mode data rate+Cancel Command Length×Command Mode data rate.

So, an example of the time required to cancel printing in a "typical" case with the invention is:
Print Data Mode (Swath) data rate=5 microseconds/byte.
Command Mode data rate=100 microseconds/byte.
Swath Buffer Size=128,000 bytes.
Swath Bytes Transferred=100,000
Cancel Command Length=64 bytes.
Time To Purge Print Job=28,000×5 microseconds+64×100 microseconds=0.1464 seconds.

As is shown in FIGS. 1–3, it can thus be seen that the present invention provides an inventive method of controlling print jobs in a printer 10 receiving print jobs from one or more host computers 12, and the method comprises the steps of sending a print job from the host computer 12 to the printer 10 where the print job includes at least one or more print data swaths, sending a command from the host computer 12 to the printer 10 where the command is embedded in the print data swath, and altering a function of the printer 10 with respect to the print job based upon the command received. The method preferably further includes the step of sending a message, such as an alert, from the printer 10 to the host computer 12 once the function in the printer 10 has been 10 altered, an example of which is the flag sent at step 46 once the print job is purged.

The step of altering a function of the printer 10 is preferably purging a print job in the printer queue 30. And as discussed above, the step of sending a command is preferably sending a series of characters in the print data swath, such as a set of NULL characters.

While there has been shown a preferred embodiment of the present invention, it is to be understood that certain changes can be made in the forms and arrangement of the elements and the steps of the method without departing from the underlying spirit of the invention as is particularly set forth in the claims. Further, all elements claimed in means-plus-function language are intended to encompass all structures, materials, acts and equivalents as would be known to one of skill in the art in providing that element in creation of the present invention.

What is claimed is:

1. A system for controlling a print job in a printer, comprising:
   a printer that receives print jobs from one or more host computers, the printer including a processor that receives a print data swath from the one or more host computers, the print data swath including at least a predefined group of characters; and
   at least one host computer in communication with the printer, the host computer selectively sending print jobs including one or more print data swaths and command data to the printer, the host computer further selectively sending a command comprised of a predetermined group of characters in the print data swath, the command altering a function in the printer.

2. The system of claim 1, wherein the command sent from the host computer purges a print job in the printer.

3. The system of claim 2, wherein the command purges a print job from a queue of the printer.

4. The system of claim 1, wherein the command is comprised of a series of identical characters.

5. The system of claim 4, wherein the receipt of the command causes the printer to enter a command mode and perform the commanded function.

6. The system of claim 5, wherein the command is comprised of a series of null characters.

7. The system of claim 5, wherein the printer further sends a message to the host computer once the function in the printer has been altered to have the host computer cease sending the stream of characters which comprise the command.

8. A system for controlling a print job in a printer, comprising:
   a printer that receives print jobs from one or more host computers, the printer including a processing means for receiving a print data swath from the one or more host computers and processing the print data swath, the printer further including a printing means that receives the processed print data swath from the processing means, the print data swath including at least a predefined group of characters; and
   at least one host computer in communication with the printer, the host computer selectively sending print jobs including one or more print data swaths and command data to the processing means of the printer, the host computer further selectively sending a command comprised of a predetermined group of characters in the print data swath, the command altering a function in the printer.

9. The system of claim 8, wherein the command sent from the host computer purges a print job in the printing means.

10. The system of claim 9, wherein the printing means includes a queue, and wherein the command purges a print job in the queue.

11. The system of claim 8, wherein the command is comprised of a series of identical characters.

12. The system of claim 11, wherein the receipt of the command causes the printer to enter a command mode and perform the commanded function.

13. The system of claim 10, wherein the command is comprised of a series of null characters.

14. The system of claim 8, wherein the printer further includes message means for sending a message from the printer to the host computer once the function in the printer has been altered.

15. A method of controlling print jobs in a printer receiving print jobs from one or more host computers, the method comprising the steps of:

sending a print job from the host computer to the printer, the print job including at least a print data swath;

sending a command from the host computer to the printer, the command embedded in the print data swath; and altering a function of the printer with respect to the print job based upon the command received.

16. The method of claim 15, wherein the step of altering a function of the printer is purging a print job.

17. The method of claim 15, wherein the step of the sending a print job is sending a print job to a queue in the printer, and wherein the step of purging a print job is purging a print job from the queue.

18. The method of claim 15, wherein the step of sending a command is sending a series of characters in the print data swath.

19. The method of claim 18, further including the step of receiving the command at the printer, and the printer entering a command mode and performing the commanded function.

20. The method of claim 15, wherein the step of sending a series of characters is sending a series of null characters.

21. The method of claim 15, further including the step of sending a message from the printer to the host computer once the function in the printer has been altered.

22. The method of claim 19, further including the steps of:

after entering the command mode, sending a message from the printer to the host computer to request the host computer to step sending the characters which comprise a command; and receiving the message at the host computer, whereupon the host computer ceasing to send the characters which comprise the command.

* * * * *